Jan. 28, 1969  H. CHELNER ET AL  3,424,000
SEMICONDUCTOR FLOWMETER
Filed July 29, 1966  Sheet 1 of 2
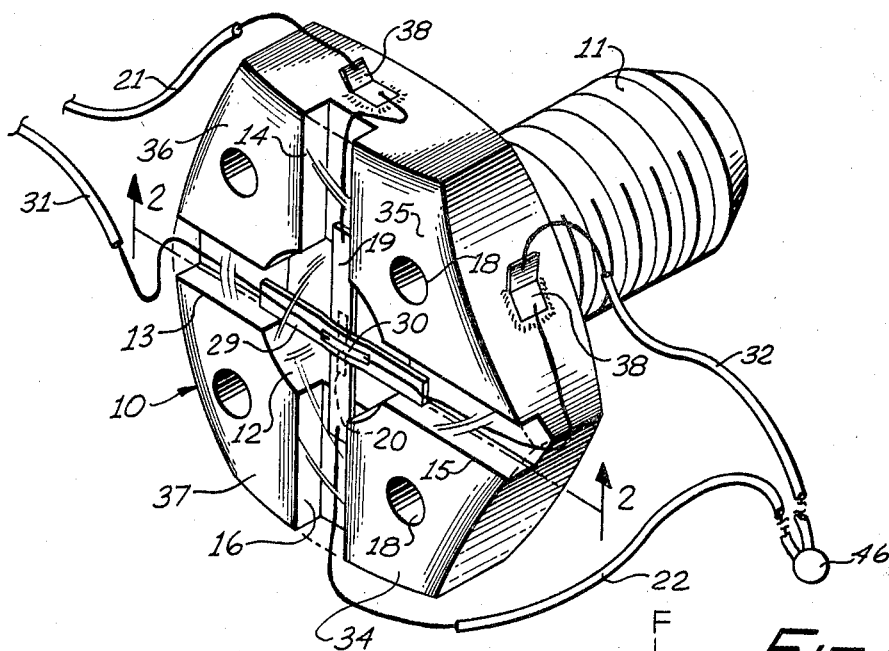
INVENTORS
HERBERT CHELNER
WILLIAM L. BUBEL
BY
Thomas S. MacDonald
ATTORNEY Jan. 28, 1969           H. CHELNER ET AL           3,424,000
                        SEMICONDUCTOR FLOWMETER
Filed July 29, 1966                              Sheet 2 of 2
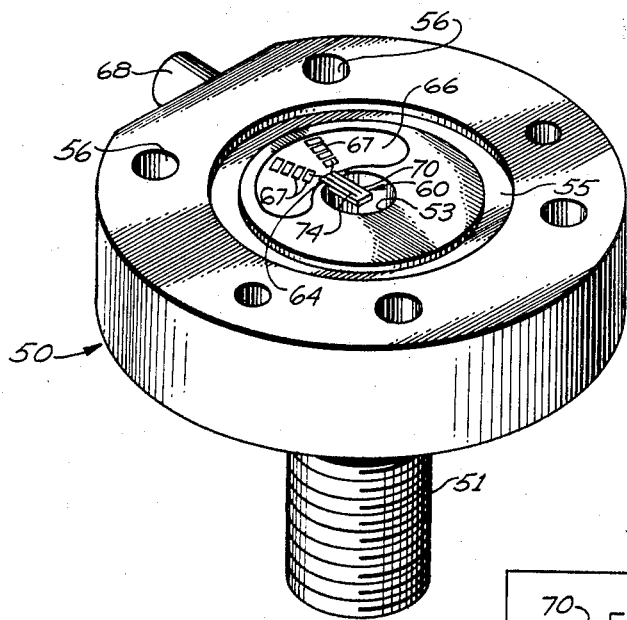
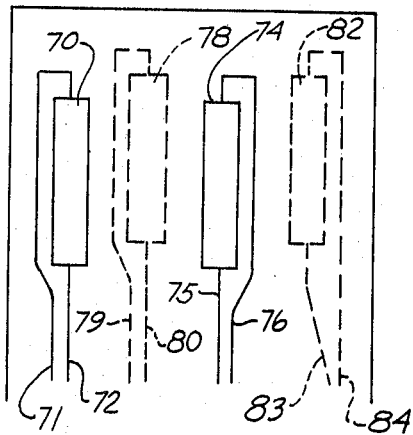
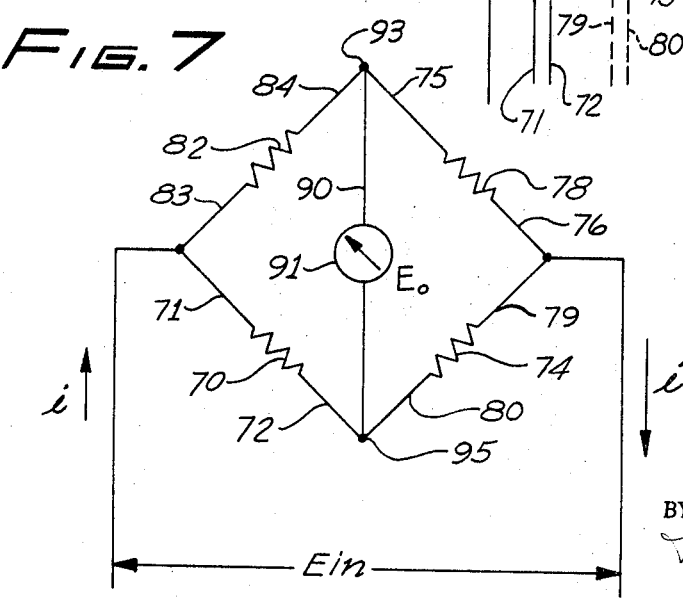
INVENTORS.
HERBERT CHELNER
WILLIAM L. BUBEL
BY
Thomas S. MacDonald
ATTORNEY

United States Patent Office 3,424,000
Patented Jan. 28, 1969

3,424,000
SEMICONDUCTOR FLOWMETER
Herbert Chelner, Reseda, and William L. Bubel, Simi, Calif., assignors to North American Rockwell Corporation, a corporation of Delaware
Filed July 29, 1966, Ser. No. 568,880
U.S. Cl. 73—228
Int. Cl. G01f 1/06
2 Claims

ABSTRACT OF THE DISCLOSURE

A flowmeter capable of being inserted in a fluid line characterized by a housing and strain gages mounted on at least one semiconductor strip disposed partially or completely across an opening formed in the housing so as to be aligned in the fluid path. In one embodiment a single strip is mounted in cantilevered relationship to the housing. In another embodiment two strips are attached at their opposite ends to the housing and perpendicularly intersect one another. The strain gages are wired in a bridge circuit that converts sensed electrical resistance changes into flow velocities.

---

This invention relates to flowmeters and more specifically to flowmeters incorporating a sensor of the semiconductor, strain gage type for converting strain values caused by fluid flow into electrical signals.

Conventional flowmeters presently being used are inadequate for accurately measuring the rate of pulsating irregular fluid flow, especially in a small diameter conduit. These flowmeters perform satisfactorily for measuring steady state flowrates when positioned in large diameter conduits. Some of the more common flowmeters for measuring pulsating fluid use electromagnetic, hot-wire anemometer or velocity head type transducers. Only the hot-wire anemometer flowmeter is somewhat reliable in measuring pulsating flow. The velocity head type of transducer ordinarily has an immersed target, an attached cantilevered arm and an inverted strain tube upon which strain gages are mounted. The fluid force exerted on the target is obtained by a pressure drop across the target which is transformed into strain in the strain tube. The components used are relatively massive however and high frequency response cannot be obtained.

Semiconductor strain gage type transducers are known in the prior art, as shown in U.S. Patent 3,049,685 to W. V. Wright, Jr. However, most are used to measure point loads rather than evenly distributed loads exerted by the pressure of flowing fluid. The point load is generally exerted against a prime mover which then transfers the load in the form of strain to the semiconductor strain gage. Since the prime mover is an intermediate member between the load to be measured and the strain sensitive transducer, inaccuracies develop in the load transmission.

The flowmeter of the instant invention is similar to the flowmeter disclosed in a copending U.S. application identified as S.N. 313,276 filed Oct. 2, 1963 now issued U.S. Patent No. 3,298,233, assigned to the same assignee as this application is. This flowmeter overcomes the deficiencies of prior art flowmeters. It is capable of accurately measuring pulsating fluid flow issuing through relatively small diameter conduits. The transducer element is positioned in the path of fluid flow and itself acts as the prime mover thus avoiding the necessity of an intermediate prime mover. Semiconductor material such as silicon or germanium have gage factors in a range of between 50 and 100 times greater than the gage factors of the more common types of metal, wire or foil strain gages.

Semiconductors can achieve a high sensitivity and natural frequency responsive to changing flow conditions. A semiconductor is inherently piezo resistive meaning that forces exerted against it cause a change in its electrical resistance. When the semiconductors are disposed in the arms of a Wheatstone bridge these changes in electrical resistance are detected by the unbalancing of the bridge. Output signals in the Wheatstone bridge circuit are passed through a signal meter calibrated to indicate a reading corresponding to the flow velocity which has caused the strain.

An object of this invention is to provide a flowmeter with a highly responsive semiconductor strain gage degree of straining in response to a uniformly distributed fluid load as a measurable function of the flow velocity.

In order to achieve its objectives and advantages, the flowmeter of the instant invention has a housing formed with a fluid passageway and attachment elements so that the flowmeter can be inserted into a fluid line. A plurality of semiconductor strain gages are mounted on semiconductor strip material which is fixed to the housing and extends into the passageway. In one embodiment, the strip material is in the form of a cantilevered beam and in an alternative embodiment, a pair of strips cross one another. The strain gages are disposed in arms of a Wheatstone bridge which incorporates an output signal meter calibrated to indicate flow intensities whenever the strain gages are being strained.

The advantages and uniqueness of the instant invention can best be understood by studying the following detailed description of the invention in connection with the drawings in which:

FIG. 1 is a perspective view of one embodiment of the invention showing a pair of crossover semiconductor strain gages positioned in a fluid passageway.

FIG. 2 is a cross-sectional view taken along line 2—2 of FIG. 1 showing deflection by the strain gages during fluid flow conditions.

FIG. 3 shows a Wheatstone bridge circuit in which the strain gages are connected.

FIG. 4 is a perspective view of another embodiment of this invention showing a semiconductor cantilevered arm having strain gages formed thereon.

FIG. 5 is a side view showing the embodiment of FIG. 4 coupled to a mating member prior to insertion in a fluid line.

FIG. 6 is an enlarged view of the cantilevered arm showing two pairs of strain gages in solid and dotted lines.

FIG. 7 is a Wheatstone bridge circuit with which the strain gages are connected.

One embodiment of the flowmeter of the instant invention is shown in FIG. 1. The flowmeter has an enlarged annular housing 10 attached coaxially to a threaded stem 11. Extending centrally through housing 10 and stem 11 is a fluid passageway 12. Formed in one face of housing 10 are four equiangularly spaced radially extending grooves 13, 14, 15, and 16. The grooves divide the face of housing 10 into quadrants 34, 35, 36, and 37. Passing through the outer margin of each quadrant 34, 35, 36, and 37 is an aperture 18 to be utilized in fixing the flowmeter in a fluid line (not shown).

The particular configuration of the flowmeter is primarily dictated by the ease of inserting it between two conduit sections. For example, stem 11 can be screwed into an internally threaded conduit section and lock bolts (not shown) can be passed through apertures 18 as well as apertures in a flange secured to the other conduit section. Ordinary lock nuts can then be attached to the lock bolts to firmly fix the flowmeter in fluid tight relationship between the two conduit sections. In the alternative, a pair of housing 10 and stem 11 units can be first coupled together and then their stems 11 screwed into conduit sections. Stem 11, in fact, can be replaced by an internally threaded recess which then receives an externally threaded conduit section.

A semiconductor strip 19 lies across passageway 12 with its opposite ends positioned in grooves 14 and 16. Similarly, a semiconductor strip 29 lies across passageway 12 with its opposite ends disposed in grooves 13 and 15. Disposed on semiconductor strip 29 is a semiconductor strain gage 30. Disposed on semiconductor strip 19, as shown in dotted line in FIG. 1, is a semiconductor strain gage 20. Strain gages 20 and 30 can be formed on their respective strips by any suitable techniques such as bonding, planar diffusion, epitaxial growth or the like. Strain gages 20 and 30 are of shallow depth relative to the thickness of strips 19 and 29. Whenever a strip is deflected, its convex surface is stressed in tension and its concave face is stressed in compression. The strain gages are formed so as to experience maximum compressive or tensile strain.

Strain gages 20 and 30 cross one another at right angles and lie within a plane perpendicular to the axis of passageway 12. The point at which the strain gages cross lies along the axis of passageway 12. The flowmeter is capable of accurately measuring pulsating, irregular flow as well as steady state flow. This is achieved in part due to the extrasensitive characteristics inherent in the semiconductor material used in constructing both the strain gages and their base strips.

The semiconductor material used can be silicon, germanium, carbon or any other suitable element which is tetravalent, that is, the element must have four electrons in its outer shell that are capable of responding to external forces. When relatively small quantities of impurities are added to these elements crystal structures are formed which are extra piezo resistive and especially suitable for sensing pulsating flow conditions. It is well known that when tensile or compressive stresses are exerted against semiconductor material its electrical resistance will be increased or decreased depending upon the type of impurity utilized in the crystal structure. When N-type semiconductor material is compressed, the resulting strain produces an increased electrical resistance in the material. Strain resulting from tensile force results in decreased electrical resistance. For P-type semiconductor material, electrical resistance characteristics are opposite. Tensile strains increase and compressive strains decrease electrical resistance in P-type semiconductor material.

An N-type semiconductor refers to semiconductor material which has been doped with a pentavalent impurity such as arsenic, antimony, bismuth and phosphorus. These impurities are referred to as donor impurities since each atom contributes an excess electron to the crystal. A P-type semiconductor is achieved by doping semiconductor material with a trivalent impurity such as aluminum, indium, gallium, boron or the like. These are referred to as acceptor impurities because each atom contributes one hole to the crystal structure and the hole tends to seek an excess electron.

In one illustration of this invention, strain gages 20 and 30 are constructed of P-type semiconductor material while semiconductor strips 19 and 29 are constructed of N-type semiconductor material. The advantages of the instant invention could be achieved without doping semiconductor strips 19 and 29 with any impurity. In such a case the strip material would be referred to as an intrinsic semiconductor. However, by employing a type of semiconductor material opposite to that used to construct the strain gages, a superior insulation is achieved and better electrical resistance results. The order of the materials could be reversed. That is, strain gages 20 and 30 could be made of N-type semiconductor material and semiconductor strips 19 and 20 would then preferably be made of P-type semiconductor material.

Fluid flowing through passageway 12 in a direction from housing 10 toward stem 11 will strike strips 19 and 29, forcing them to bow and deflect in the same direction. The extreme ends of strips 19 and 29 are restrained from translating movement so that the values of strain sensed in the gages will always correspond to a particular flow intensity. As shown in FIG. 2, the ends of strip 29 are embedded in masses of epoxy adhesive 17 which are retained in the grooves 13 and 15 as shown in FIG. 1. Attached to the extreme ends of gage 20 are electrical leads 21 and 22. Electrical leads 31 and 32 are attached to the extreme ends of gage 30. These leads may be gold wires which are welded to solder tabs 38. In the alternative, a section of the electrical leads for the strain gages may be vapor deposited on the strips.

During pulsating flow conditions when fluid rams the surfaces of semiconductor strips 19 and 29, there exist periods of momentary fluid stagnation. During these periods of stagnation, the load exerted by fluid pressure is uniformly distributed on the semiconductor strips. The degree of strain corresponds to a particular flow intensity.

The direction of fluid force designated by letter F in FIG. 2 will cause an identical degree of deflection in the semiconductor strips. Strain gage 30 formed in the upper face of semiconductor strip 29 will experience compressive strain and strain gage 20 formed in the lower face of semiconductor strip 19 will, at the same time, experience tensile strain. A bead of epoxy resin 40 joining the midpoints of strain gages 20 and 30 serves as insulation means to separate them and prevent relative shifting. Contact between the strain gages could result in short circuiting and relative shifting could result in slightly unpredictable degrees of deflection. The strain gages are protected from corrosive effects of the fluid by suitable fluid resistant film such as polyvinylidene fluoride.

Due to the piezo resistive nature of P-type semiconductor material, previously mentioned, compressive strain in strain gage 30 will cause a decreased electrical resistance. The tensile strain in strain gage 20 will produce an increased electrical resistance. By arranging the strain gages in a Wheatstone bridge as shown in FIG. 3, the variances and electrical resistance can be detected and the flow intensity, being a function of the resistance change, can be determined.

The Wheatstone bridge shown in FIG. 3 incorporates a pair of active arms constituted by strain gages 20 and 30 and a pair of dummy arms 25 and 26 of predetermined constant electrical resistance. The Wheatstone bridge is connected across a source of input voltage $E_{in}$ and has a bridge 42 in which is connected a suitable output signal meter 43. Meter 43 is calibrated to indicate flow intensities corresponding to predetermined values of strain sensed in strain gages 20 and 30. The current transmitted through meter 43 is a function of flow intensity.

Electrical lead lines 22 and 32 of strain gages 20 and 30 respectively are wired together at a junction 46 through which an input current $i$ is transmitted into the Wheatstone bridge circuit. Electrical lead line 31, one end of bridge line 42, and one end of the line connected to dummy resistors 25 and 26 are fixed at approximately Electrical lead line 21, the other end of bridge line 42 and one end of the line connected to the resistor 26 are connected together at point 44. The other ends of the electrical lines connected to dummy resistors 25 and 26 are connected together at point 47. The resistances of dummy resistors 25 and 26 are fixed at approximately two to four times higher than the maximum resistance to be experienced in the strain gages in order to assist in achieving a built-in temperature compensation in the Wheatstone bridge. The temperature changes in a Wheatstone bridge effect all of the arms equally so that no unbalancing of the bridge results due to temperature fluctuations.

The increased electrical resistance in the strain gage 20, as mentioned above, will produce an increased electrical potential at point 44. The decreased electrical resistance in strain gage 30 will produce a decreased electrical potential at point 45. The changes in potential at points 44 and 45 are equal but opposite. The resulting voltage unbalances bridge 42 in which is generated a current that is passed to meter 43. Meter 43 then indicates the exact rate of flow of the fluid passing through passageway 12.

If the direction of flow through the flowmeter is in the opposite direction, that is, if the fluid is passing from stem 11 through housing 10, then strain gages 20 and 30 will be forced to bow in the reversed direction. In this case strain gage 30 will experience tension and strain gage 20 will experience compression. The strains sensed will cause increased electrical resistance in gage 30 and decreased electrical resistance in gage 20. For equal but opposite flow intensities the voltage across bridge line 42 will also be equal but opposite. Current passing from point 44 to 45 will indicate this condition. Thus, not only is the flowmeter capable of measuring flow intensity but it can also indicate the direction of flow. The output voltage $E_0$ to which output signal meter 43 responds is proportional to the density of fluid being measured, multiplied by the fluid velocity squared, multiplied by a calibration constant. Those acquainted with determining calibration factors for flowmeters will immediately appreciate numerous techniques for calculating a calibration factor.

Another embodiment of the flowmeter of the instant invention is shown in FIG. 4. The flowmeter has a housing 50 connected in coaxial relationship to a threaded stem 51. Extending through the center of housing 50 and stem 51 is a fluid passageway 53. In one face of housing 50 there is an annular groove 55 in which an O-ring (not shown) or other type of annular seal is to be seated. A series of apertures 56 are drilled in the outer periphery of housing 50. To insert the flowmeter package into a fluid line, housing 50, with the sealing ring seated in groove 55, is placed in abutting relationship with a mated housing 96 as shown in FIG. 5. Housing 96 has a threaded stem similar to stem 51. Referring to FIG. 5, lock bolts 98 are inserted through apertures 56 and registering apertures in housing 96. Then lock nuts 99 are used to firmly fasten housings 50 and 96 together. The sealing ring serves to prevent leakage from between housings 50 and 96. The conduit sections (not shown) of the fluid line in which the flowmeter is to be installed are then screwed on to threaded stems 51 and 97 in fluid tight relationship. Alternatively the ends of the conduit sections may be formed with external threads and recesses formed in housings 50 and 96 with internal threads to receive the conduit sections. It should be understood that the flowmeter embodiments of FIG. 1 and FIG. 4 may have their flow line attachment means modified so as to be interchangeable with one another.

Projecting into fluid passageway 53 and perpendicular to its axis is a cantilever beam semiconductor wafer 60. Formed in housing 50 is a radially extending groove 64 retaining a mass of epoxy adhesive (not shown) in which an end section of wafer 60 is firmly embedded. This is accomplished in a manner similar to the way that the ends of strip 29 are embedded in masses of epoxy 17 as shown in FIG. 2. The cross-sectional configuration of wafer 60 is shown as rectangular although this is unimportant and other configurations such as oval or elliptical could be used. Positioned on the outer face of wafer 60 as shown in FIGS. 4 and 6, are semiconductor strain gages 70 and 74. On the reverse face of wafer 60, as shown in dotted lines in FIG. 6, is another pair of semiconductor strain gages 78 and 82. Electrical lead lines attached to the four strain gages, shown in detail in FIG. 6, are taken into a shallow recess 66 formed in housing 50 where they are attached to recessed solder taps 67. The recess 66 and groove 64 allow abutment of the flat face of the housing 50 with adjacent conduit sections and afford protection for the five connection points between the gages and the taps. The lead lines are then passed outwardly of housing 50 through an electrical connector 68 where they are connected in a Wheatstone bridge circuit.

Referring to FIG. 5, strain gages 70 and 74 are shown on one face of wafer 60 and another pair of strain gages 78 and 82 are shown in dotted lines on the opposite face of wafer 60. P-type semiconductor material is used in the construction of wafer 60. In contrast, the strain gages 70, 74, 78 and 82 are constructed from N-type semiconductor materials. Conversely, the types of semiconductor materials used to construct the wafer 66 and the four strain gages could be reversed.

The zone in which N-type and P-types semiconductor materials are bonded together is known as a PN junction or a diode junction. PN junctions exist at the interfaces between the four strain gages and wafer 60. A PN junction is desirable because it forms a good electrical insulating barrier. However, the advantages of the instant invention could be realized even through intrinsic semiconductor material in the construction of wafer 60. In order to prevent a current flow across the PN junctions and to achieve high resistance at each PN junction, electrical leads from the strain gages are connected in a "reversed biased" manner with regard to a voltage input $E_{in}$ as shown in FIG. 7. By using four strain gages, two each on opposing faces of wafer 60, they can be electrically connected as active arms in a Wheatstone bridge to completely eliminate effects of temperature variations. Measurement inaccuracies frequently caused by temperature fluctuations are thereby cancelled.

Due to the cantilever beam configuration of wafer 60, external strain effects such as those introduced by dimension changes in housing 50 are eliminated. Some slight degree of strain would be induced in a strain gage extending across passageway 53 if fixed at its opposite ends whenever changing temperature conditions enlarged or narrowed the diameter of the walls defining passageway 53. The formation of strain gages 70, 74, 78 and 82 could be achieved by various techniques such as by planar diffusion, epitaxial growth or the like. Those skilled in the semiconductor transistor art are well acquainted with these techniques which form no part of the instant invention.

Referring to FIG. 7, a predetermined input voltage $E_{in}$ is impressed across a Wheatstone bridge and induces a current $i$ through the bridge circuit. Strain gages 70 and 78 are arranged as opposing arms in the bridge and strain gages 74 and 82 are also disposed in opposing arms. During non-fluid flow conditions, bridge line 90 will be balanced and no current will be transmitted therethrough because the electrical potential at points 93 and 95 will be equal. An output signal meter 91, similar to meter 43 utilized in the other embodiment of this invention, is connected in bridge line 90. Meter 91 operates to detect the presence or absence of current and its arrow will signal changing conditions.

When fluid is flowing in a direction from head 50 through stem 51, wafer 60 will deflect toward stem 51. Strain gages 70 and 74 will experience tensile strain as strain gages 78 and 82 experience compressive strain. Due to the electrical properties of N-type piezo resistive semiconductor material as mentioned above, the electrical resistances in strain gages 70 and 74 will be decreased. The electrical resistance in strain gages 78 and 82 will be increased. The electrical potential at point 93 will be increased under the influence of the combined resistance changes in strain gages 82 and 74. At the same time the electrical potential at point 95 will be decreased due to the combined influence of the resistance changes in strain gages 70 and 78. Resulting voltage between points 93 and 95 will operate to induce a current to flow from point 93 to point 95 through bridge line 90. The current will be sensed by signal meter 91 that indicates the rate and direction of flow. Flow in the reverse direction will produce compressive strain in gages 74 and 70 and tensile strain in gages 78 and 82. The resulting voltage across bridge 90 will be exactly the same but of opposite polarity.

Current reversal will cause meter 91 to show that flow is in the opposite direction.

Preferably wafer 60 should extend between 50 and 80 percent across the opening of passageway 53. To extend it substantially beyond 80 percent would result in inaccurate readings due to the fact that the tip would be projected into a turbulence zone near the passageway wall. However, as long as the tip is just short of the turbulence zone greater strain and hence greater output readings can be attained.

The strain gages, due to their being constructed of semiconductor material, are highly responsive and have gage factors between 100 and 200 which is approximately 50 to 100 times greater than the gage factor of conventional wire or foil type strain gages. The flowmeter can be of miniature size so as to fit in very small conduits where it will have the high sensitivity to flow.

Although the invention has been described and illustrated in detail, it is to be clearly understood that the same is by way of illustration and example only and is not to be taken by way of limitation, the spirit and scope of this invention being limited only by the term of the appended claims.

We claim:
1. A flowmeter insertable in a fluid line comprising:
   a housing,
   means in said housing forming a passageway therein through which fluid can be conducted,
   strain sensitive means of piezo resistive semiconductor material mounted on said housing and extending into said passageway,
   said strain sensitive means comprising a pair of mutually crossing strain gage strips, each strip being fixed at its opposite ends to said housing,
   a Wheatstone bridge,
   means for electrically connecting said strain sensitive means to said Wheatstone bridge, and
   indicator means in said Wheatstone bridge for indicating flow intensities responsive to strain in said strain sensitive means.
2. The flowmeter according to claim 1 wherein said strips are mutually perpendicular, one of the strips being constructed of N-type semiconductor material and the other being constructed of P-type semiconductor material.

References Cited

UNITED STATES PATENTS

| 2,943,486 | 7/1960 | Osgood | 73—228 |
| 2,989,866 | 6/1961 | Widell et al. | 73—228 X |
| 3,286,526 | 11/1966 | Mulcahy et al. | 73—398 |
| 3,340,733 | 9/1967 | Lasher | 73—228 |
| 3,161,061 | 12/1964 | Ames | 73—88.55 |

FOREIGN PATENTS

| 1,110,891 | 7/1961 | Germany. |

RICHARD C. QUEISSER, *Primary Examiner.*

EDWARD D. GILHOOLY, *Assistant Examiner.*

U.S. Cl. X.R.

73—398, 88.5